United States Patent [19]

Smith

[11] 4,169,298
[45] Oct. 2, 1979

[54] WINDSHIELD WIPER ADJUSTMENT ASSEMBLY

[76] Inventor: Gordon Smith, 9714 Hawthorn Ct., Sun City, Ariz. 85351

[21] Appl. No.: 895,802

[22] Filed: Apr. 12, 1978

[51] Int. Cl.² ............................................. B60S 1/40
[52] U.S. Cl. ................................................. 15/250.33
[58] Field of Search .......... 15/250.23, 250.32, 250.33, 15/250.37–250.42

[56] References Cited

U.S. PATENT DOCUMENTS

| | | | |
|---|---|---|---|
| 2,025,888 | 12/1935 | Olivero | 15/250.4 X |
| 2,270,589 | 1/1942 | Hansen | 15/250.32 X |
| 3,751,754 | 8/1973 | Quinlan et al. | 15/250.32 |

FOREIGN PATENT DOCUMENTS 632953  12/1949  United Kingdom ................. 15/250.32

Primary Examiner—Peter Feldman
Attorney, Agent, or Firm—Alter and Weiss

[57] ABSTRACT

A windshield wiper adjustment assembly for eliminating chatter and squeak and effecting smooth travel of a windshield wiper as it is drawn across a windshield. The adjustment assembly allows the angular displacement of the wiper retainer to be selectively varied.

14 Claims, 11 Drawing Figures

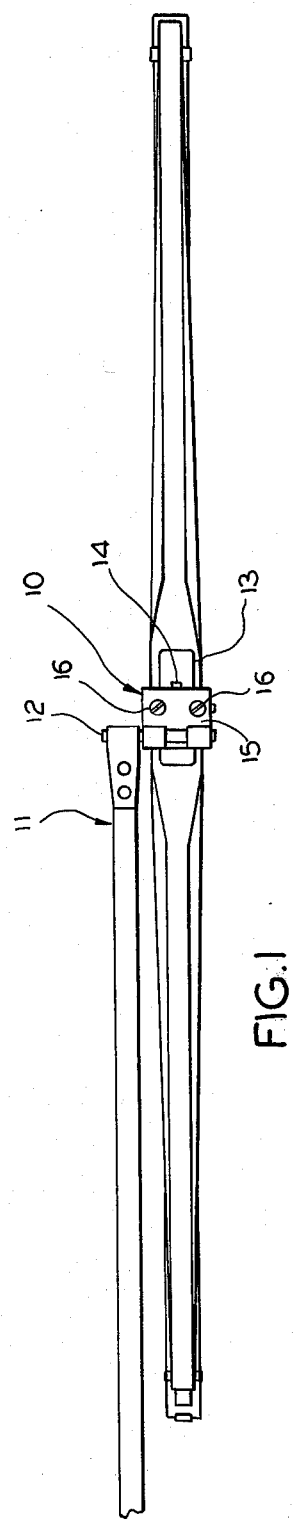
FIG.1
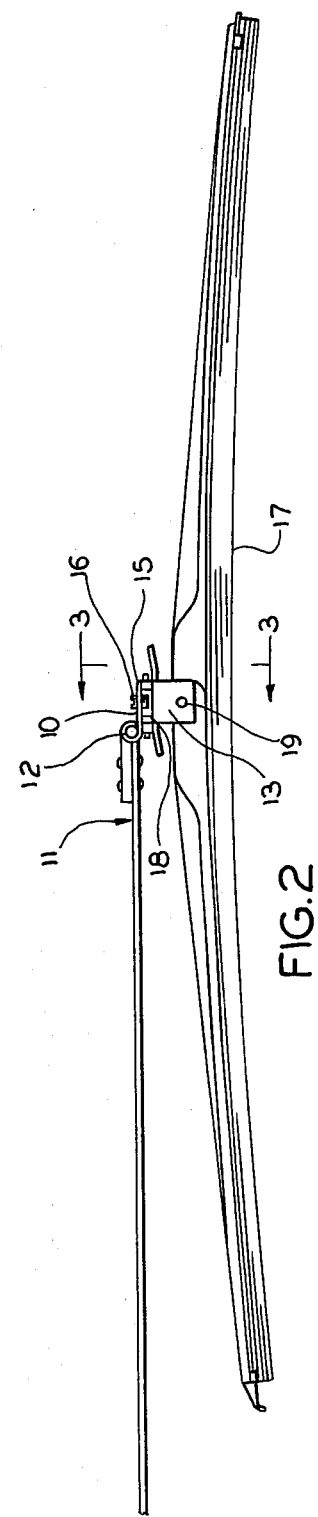
FIG.2
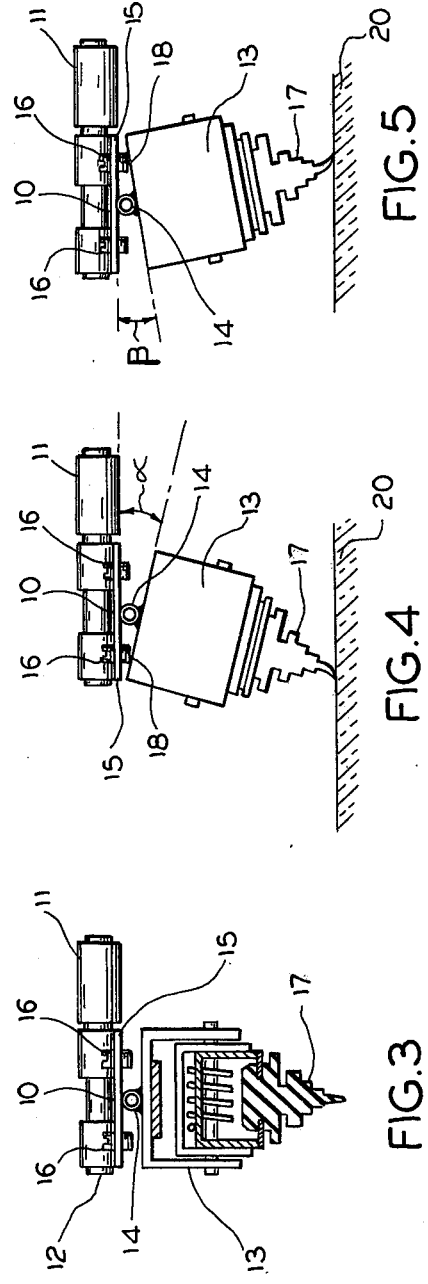
FIG.3
FIG.4
FIG.5

WINDSHIELD WIPER ADJUSTMENT ASSEMBLY

BACKGROUND OF THE INVENTION

The present invention relates in general to windshield wipers and in particular to a windshield wiper adjustment assembly.

The type of windshield wiper in use today does not allow a great deal of relative motion between the drive arm and the wiper retainer. Thus, for the most part, the wiper retainer maintains the same position with respect to the windshield as the wiper is drawn across the windshield. The seal between the wiper blade and the windshield is due to the flexibility of the wiper blade; a portion of the side of the blade is pressed to the windshield. As the wiper blade becomes worn, a greater portion of the side of the blade is pressed to the windshield and the blade increasingly fatigues. As the blade becomes more fatigued, the glade material becomes more flexible. When the direction of the windshield wiper is reversed, a greater portion of the blade must also reverse its direction. Thus, the blade moves in the opposite direction without alternating the side of the blade lying upon the windshield. The chances of chatter and squeak occurring are increased as the blade becomes worn.

Accordingly, this invention has the following objects:

To eliminate chatter and squeak and effect smooth travel of the windshield wiper;

To allow the angular displacement to the wiper retainer to be selectively adjusted;

To reduce the wear and fatigue of the wiper blade; and

To increase the effectiveness of the windshield wiper in maintaining good visibility herein.

These and further objects will become more apparent upon consideration of the accompanying drawings in which:

FIG. 1 is a top elevational view of the windshield wiper assembly with the adjustment assembly included;

FIG. 2 is a front elevational view of the windshield wiper assembly with the adjustment assembly included;

FIG. 3 is a side cross-sectional view of the windshield wiper assembly with the adjustment assembly;

FIG. 4 is a side elevational view of the windshield wiper and adjustment assemblies when the windshield wiper is drawn across the windshield;

FIG. 5 is a side elevational view of the windshield wiper and adjustment assemblies as the windshield wiper is drawn across the windshield in the opposite direction of FIG. 4;

Figure 6:
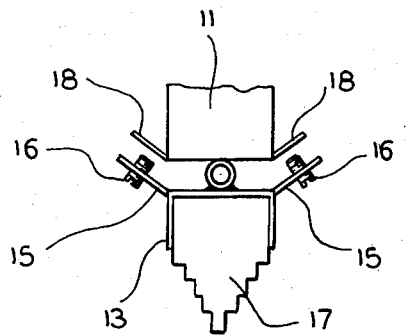
FIG. 6 is a side view of the adjustment assembly extending angularly.

Consistent with the foregoing objects, Applicant herein provides a windshield wiper adjustment assembly 10 pivotally connected to drive arm 11 and to wiper retainer 13. Adjustment assembly 10 has two flaps 15, each of which has a projection 16 extending from the flap toward the upper surface of wiper retainer 13 such that projection 16 contacts upper surface 18 limiting the maximum angular displacement of the wiper retainer with respect to the drive arm while the wiper is drawn across the windshield.

DETAILED DESCRIPTION

While this invention is susceptible of embodiment in many different forms, there are shown in the drawings and will herein be described in detail, several specific embodiments, with the understanding that the present disclosure is to be considered an exemplification of the principles of the invention and is not intended to limit the invention to the embodiments illustrated.

The windshield wiper and adjustment assemblies are shown in FIG. 1 of the drawings, with adjustment assembly 10 pivotally connected to drive arm 11 at pivot point 12. Adjustment assembly 10 is in turn pivotally connected to wiper retainer 13 at pivot point 14. Flap 15 is shown with two threaded fasteners 16 as part of adjustment assembly 10.

FIG. 2 shows adjustment assembly 10, drive arm 11, wiper retainer 13, and wiper 17. In this embodiment, adjustment assembly 10 is shown connected to drive arm 11 at pivot 12. Adjustment assembly 10 is shown consisting of flap 15, threaded fasteners 16, and limiting arm 18 which, in this embodiment, is the upper surface of wiper retainer 13. Wiper 17 is held by wiper retainer 13; wiper retainer 13 is connected to adjustment assembly 10 at pivot 19.

In FIG. 3, drive arm 11 is shown connected to adjustment assembly 10 by pivot 12. Adjustment assembly 10 is shown connected to wiper retainer 13 by pivot 14. Two threaded fasteners 16 are shown extending through flap 15.

In FIG. 4 of the drawings, windshield wiper 17 is shown drawn across windshield 20 pivoting windshield wiper 17 and wiper retainer 13 about pivot connection 14 until threaded fastener 16 contacts limiting arm 18. Angle α is shown as the angle at which wiper retainer 13 is maintained with respect 20 to drive arm 11 while wiper 17 is drawn across windshield 20 in one direction. Angle α can be selectively adjusted by lowering or raising one of threaded fasteners 16 in flap 15.

FIG. 5 shows wiper retainer 13 at Angle β with respect to drive arm 11 as windshield wiper 17 is drawn across windshield 20 in the direction opposite to that shown in FIG. 4. Angle β need not be the same as Angle α as threaded fasteners 16 may be individually positioned.

Figure 7:
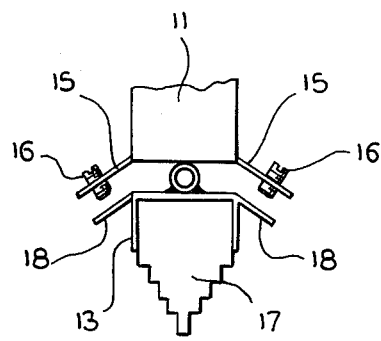
FIG. 7 is a side view of the adjustment assembly extending angularly.

FIG. 6 shows flaps 15 extending angularly outward from wiper retainer 13. Each flap 15 has a threaded fastener 16 extending therethrough and when wiper retainer 13 is pivoted, threaded fasteners 16 will contact limiting arms 18 which extend angularly from drive arm 11. In FIG. 7, flaps 15 are shown extending angularly from drive arm 11 and limiting arms 18 extend angularly from wiper retainer 13.

Figure 8:
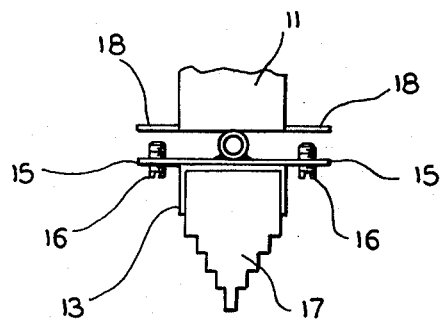
FIG. 8 is a side view of the adjustment assembly extending horizontally.

In the embodiment shown in FIG. 8, both limiting arms 18 extending from drive arm 11 and flaps 15 extending from wiper retainer 13 are horizontal.

Figure 9:
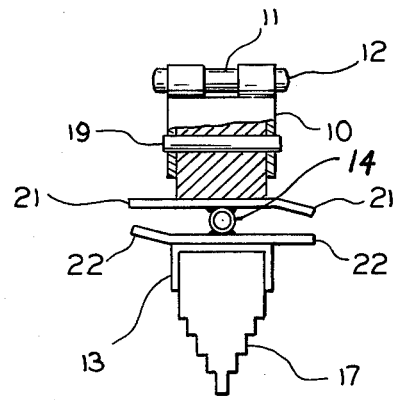
FIG. 9 is a partial side sectional view of a second embodiment of the windshield wiper adjustment assembly.

FIG. 9 shows another embodiment of the windshield wiper in which drive arm 11 is parallel to and above wiper retainer 13. This embodiment could exist on cars having windshield wipers that do not disappear below the hood edge. Adjustment assembly 10 is pivotally connected to drive arm 11 at pivot 12 and is in turn pivotally connected to wiper retainer 13 at pivot 14. Adjustment assembly 10 has flexible flaps 21 extending outward from the upper portion of adjustment assembly 10 and 22 extending outward from wiper retainer 13. Flexible flaps 21 and flexible arms 22 can be bendably positioned so as to limit the maximum angular displacement of wiper retainer 13 with respect to drive arm 12. Additionally, flexible flaps 21 or flexible arms 22 can be used in conjunction with limiting arm 18 as shown in FIGS. 5 through 8 to limit the maximum angular displacement. Thus, for instance, flexible flaps 21 may extend from wiper retainer 13 and limiting arms 18 may extend from drive arm 11 or flexible flaps 21 may extend from drive arm 11 and limiting arms from wiper retainer 13. Also, it is possible for flexible flaps 21 an arms 22, limiting arms 18, and flaps 15 with projections 16 to be used in many combinations together.

Figure 10:
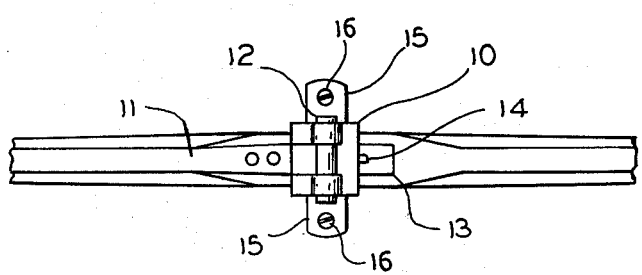
FIG. 10 is a partial top view of the adjustment assembly having flexible flaps and wings.
Figure 11:
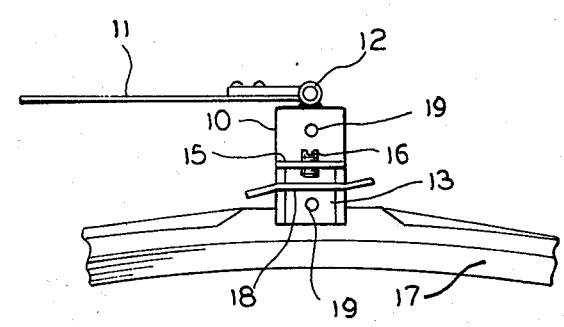
FIG. 11 is a partial side view of the wiper asssembly of FIG. 10.

FIGS. 10 and 11 show adjustment assembly 10 with drive arm 11 mounted parallel to and above wiper 17. Adjustment assembly 10 is attached to drive arm 11 at pivot 12, and to wiper retainer 13 at pivots 19, in an arrangement intended for wipers which do not travel below the hood edge.

While the principles of the invention have been described above in connection with specific apparatus and applications, it is to be understood that this description is made by way of example only and not as a limitation on the scope of the invention.

What is claimed is:

1. In a windshield wiper assembly of the type wherein a wiper blade is pressed to and moved across a windshield, said wiper blade being held in a wiper retainer which is, in turn, joined at a connection to a drive arm, the improvement comprising:
   means for selectively setting the angle at which said wiper retainer is maintained with respect to said drive arm while said blade is being drawn across said windshield;
   said means for selectively setting said angle including flap means which cooperate with said wiper retainer;
   said means for selectively setting said angle further including adjustment means which cooperate with said flap means to set said angle.

2. The invention according to claim 1 in which said adjustment means comprises:
   means for limiting the maximum angular displacement of said wiper retainer with respect to said drive arm.

3. The invention according to claim 2 in which said adjustment means further comprises:
   at least one projection extending from said flap means toward said limiting means,
   said projection extending from said flap means to contact said limiting means to restrict the maximum angular displacement of said wiper retainer with respect to said drive arm.

4. The invention according to claim 2 in which said flap means comprises a flexible flap which can be bent as desired so as to contact said limiting means to restrict the maximum angular displacement of said wiper retainer with respect to said drive arm;
   said limiting means comprising limiting arm wing means positioned substantially in alignment with said flap and co-operating with said flap to effectuate said angular displacement limitation.

5. The invention according to claim 2 in which said limiting means comprises an upper surface of said wiper retainer.

6. The invention according to claim 2 in which said wiper retainer is pivotally connected to said flap means of said adjusting means.

7. The invention according to claim 2 in which said wiper retainer is pivotally connected to said drive arm.

8. The invention according to claim 2 in which said flap means is connected to said drive arm and said limiting means is connected to said wiper retainer.

9. The invention according to claim 2 in which said flap means is connected to said wiper retainer and said limiting means is connected to said drive arm.

10. The invention according to claim 1 in which said adjustment means comprises:
    at least on flexible flap;
    at least one arm spaced apart from and corresponding to said flexible flap,
    said flexible flap contacting said arm to limit said angular displacement of said wiper retainer with respect to said drive arm,
    said flexible flap being selectively bent to change the maximum angular displacement.

11. The invention according to claim 10 in which said arm is flexible and can be bent to change said maximum angular displacement.

12. In a windshield assembly of the type wherein a wiper blade is pressed to and moved across a windshield, said wiper blade being held in a wiper retainer which is, in turn, joined at a connection to a drive arm, the improvement comprising:
    two flaps,
    said flaps pivotally connected to said wiper retainer,
    said flaps extending in opposite directions from said pivot substantially parallel to an upper surface of said wiper retainer,
    each said flap having a tapped hole therethrough; and
    a threaded element positioned in said tapped hole, selectively extendable toward or away from said upper surface of said wiper retainer,
    said threaded element contacting said upper surface of said wiper retainer limiting the maximum angular displacement of said wiper retainer with respect to said drive arm while said wiper blade is being drawn across said windshield,
    said angular displacement being increased or decreased by selectively adjusting said threaded element away from or toward said upper surface of said wiper retainer, respectively.

13. In a windshield wiper assembly of the type wherein a wiper blade is pressed to and moved across a windshield, said wiper blade being held in a wiper retainer which is, in turn, joined at a connection to a drive arm, the improvement comprising:
    means for selectively adjusting the angle at which said wiper retainer is maintained with respect to said drive arm while said blade is being drawn across said windshield;
    said adjusting means comprising means for limiting the maximum angular displacement of said wiper retainer with respect to said drive arm;
    said means for limiting displacement including one or more flap means which co-operate with said wiper retainer to describe the limits of said angular displacement;
    said limiting means comprising an upper surface of said wiper retainer;

said flap means of said adjusting means further comprising two flaps;
said flaps extending in opposite directions substantially parallel to said upper surface of said wiper retainer,
each of said flaps having at least one tapped hole extending therethrough; and
a threaded element selectively extendable toward or away from said limiting means,
said threaded element positioned in said tapped hole.

14. In a windshield wiper assembly of the type wherein a wiper blade is pressed to and moved across a windshield, said wiper blade being held in a wiper retainer which is, in turn, joined at a connection to a drive arm, the improvement comprising:

means for selectively adjusting the angle at which said wiper retainer is maintained with respect to said drive arm while said blade is being drawn across said windshield;
said adjusting means comprising at least one flap;
at least one arm spaced apart from and corresponding to said flap,
said flap having at least one tapped hole therethrough;
a threaded element positioned in said tapped hole and selectively extendable toward or away from said arm; and
said angular displacement of said wiper retainer limited by said threaded element of said flap contacting said arm.

* * * * *

UNITED STATES PATENT AND TRADEMARK OFFICE
CERTIFICATE OF CORRECTION

PATENT NO. : 4,169,298
DATED : October 2, 1979
INVENTOR(S) : Gordon Smith

It is certified that error appears in the above-identified patent and that said Letters Patent are hereby corrected as shown below:

Col. 1, line 30: "displacement to the" should be --displacement of the--;

Col. 3, line 16: "an arms 22" should be --and arms 22--;

Col. 4, line 17: "least on flexible" should be --least one flexible--.

Signed and Sealed this

First Day of January 1980

[SEAL]

Attest:

SIDNEY A. DIAMOND

*Attesting Officer*  *Commissioner of Patents and Trademarks*